United States Patent
Yamamoto et al.

(10) Patent No.: US 7,546,395 B2
(45) Date of Patent: Jun. 9, 2009

(54) NAVAGATION PROCESSING BETWEEN A TRACKER HARDWARE DEVICE AND A COMPUTER HOST BASED ON A SATELLITE POSITIONING SOLUTION SYSTEM

(75) Inventors: Clifford Yamamoto, Gardena, CA (US); Sebastian Nonis, Carson, CA (US); Ashutosh Pande, San Jose, CA (US); Nikola Bulatovic, Mountain View, CA (US); Stefan Witanis, Sunnyvale, CA (US)

(73) Assignee: SiRF Technology, Inc., San Jose, CA (US)

(*) Notice: Subject to any disclaimer, the term of this patent is extended or adjusted under 35 U.S.C. 154(b) by 944 days.

(21) Appl. No.: 10/269,104

(22) Filed: Oct. 10, 2002

(65) Prior Publication Data

US 2005/0234713 A1 Oct. 20, 2005

(51) Int. Cl.
*G06F 13/14* (2006.01)
(52) U.S. Cl. ............................ 710/30; 710/34; 710/5; 709/206; 701/207; 342/357.01; 342/357.06
(58) Field of Classification Search .......... 710/5, 710/30, 34; 709/206; 701/207; 342/357.01, 342/357.06
See application file for complete search history.

(56) References Cited

U.S. PATENT DOCUMENTS

| | | | |
|---|---|---|---|
| 5,497,339 A | 3/1996 | Bernard | |
| 5,528,248 A | * 6/1996 | Steiner et al. | 342/357.06 |
| 5,663,734 A | 9/1997 | Krasner | |
| 5,663,735 A | 9/1997 | Eshenbach | |
| 5,781,156 A | 7/1998 | Krasner | |
| 5,812,087 A | 9/1998 | Krasner | |
| 5,825,327 A | 10/1998 | Krasner | |
| 5,831,545 A | 11/1998 | Murray et al. | |
| 5,831,574 A | 11/1998 | Krasner | |
| 5,832,247 A | 11/1998 | Gildea et al. | |
| 5,841,396 A | 11/1998 | Krasner | |
| 5,874,914 A | 2/1999 | Krasner | |
| 5,884,214 A | 3/1999 | Krasner | |
| 5,890,070 A | * 3/1999 | Hamada | 455/524 |
| 5,945,944 A | 8/1999 | Krasner | |

(Continued)

FOREIGN PATENT DOCUMENTS

EP 1102510 * 5/2001

(Continued)

OTHER PUBLICATIONS

Infineon Web Page, www.infineon.com, First GPS System Solution, printed from Infineon Web Site on Sep. 23, 2002, 1 page.

(Continued)

*Primary Examiner*—Tammara Peyton
(74) *Attorney, Agent, or Firm*—The Eclipse Group LLP (57) ABSTRACT

Methods and systems consistent with the present invention provide a host based positioning system. The host based positioning system includes a tracker hardware interface that connects to a dedicated hardware space vehicle tracker to a host computer. The tracker hardware interface receives positioning information from the space vehicle tracker and communicates with the host computer using predefined messages. The host based positioning system includes a layered protocol approach to enable user applications on a host computer to access data from tracker hardware device.

19 Claims, 3 Drawing Sheets

U.S. PATENT DOCUMENTS

| | | | |
|---|---|---|---|
| 5,999,124 | A | 12/1999 | Sheynblat |
| 6,002,363 | A | 12/1999 | Krasner |
| 6,016,119 | A | 1/2000 | Krasner |
| 6,052,081 | A | 4/2000 | Krasner |
| 6,061,018 | A | 5/2000 | Sheynblat |
| 6,064,336 | A | 5/2000 | Krasner |
| 6,104,338 | A | 8/2000 | Krasner |
| 6,104,340 | A | 8/2000 | Krasner |
| 6,107,960 | A | 8/2000 | Krasner |
| 6,111,540 | A | 8/2000 | Krasner |
| 6,131,067 | A | 10/2000 | Girerd |
| 6,133,871 | A | 10/2000 | Krasner |
| 6,133,873 | A | 10/2000 | Krasner |
| 6,133,874 | A | 10/2000 | Krasner |
| 6,150,980 | A | 11/2000 | Krasner |
| 6,185,427 | B1 | 2/2001 | Krasner |
| 6,208,290 | B1 | 3/2001 | Krasner |
| 6,208,291 | B1 | 3/2001 | Krasner |
| 6,209,090 | B1 | 3/2001 | Aisenberg et al. |
| 6,215,441 | B1 | 4/2001 | Moeglein |
| 6,215,442 | B1 | 4/2001 | Sheynblat |
| 6,236,354 | B1 | 5/2001 | Krasner |
| 6,239,742 | B1 | 5/2001 | Krasner |
| 6,259,399 | B1 | 7/2001 | Krasner |
| 6,272,430 | B1 | 8/2001 | Krasner |
| 6,289,041 | B1 | 9/2001 | Krasner |
| 6,307,504 | B1 | 10/2001 | Sheynblat |
| 6,313,786 | B1 | 11/2001 | Sheynblat |
| 6,314,308 | B1 | 11/2001 | Sheynblat |
| 6,314,365 | B1 * | 11/2001 | Smith ........................ 701/200 |
| 6,377,209 | B1 | 4/2002 | Krasner |
| 6,408,196 | B2 | 6/2002 | Sheynblat |
| 6,411,254 | B1 | 6/2002 | Moeglein |
| 6,411,892 | B1 | 6/2002 | Van Diggelen |
| 6,417,801 | B1 | 7/2002 | Van Diggelen |
| 6,421,002 | B2 | 7/2002 | Krasner |
| 6,429,814 | B1 | 8/2002 | Van Diggelen et al. |
| 6,430,503 | B1 | 8/2002 | McBurney et al. |
| 6,433,731 | B1 | 8/2002 | Sheynblat |
| 6,453,237 | B1 | 9/2002 | Fuchs et al. |
| 6,484,097 | B2 | 11/2002 | Fuchs et al. |
| 6,487,499 | B1 | 11/2002 | Fuchs et al. |
| 6,510,387 | B2 | 1/2003 | Fuchs et al. |
| 6,542,821 | B2 | 4/2003 | Krasner |
| 6,583,757 | B2 | 6/2003 | Krasner |
| 6,593,878 | B2 * | 7/2003 | Fall ........................ 342/357.1 |
| 6,597,311 | B2 | 7/2003 | Sheynblat |
| 6,611,755 | B1 | 8/2003 | Coffee et al. |
| 6,662,103 | B1 * | 12/2003 | Skolnick et al. ............. 701/207 |
| 2002/0070881 | A1 | 6/2002 | Tseng et al. |

OTHER PUBLICATIONS

Trimble Web Page, www.trimble.com/firstgps.html, printed from Trimble Web Site on Sep. 23, 2002, 1 page.

Trimble's FirstGPS Architecture: A Better Way to Add Location to Your Product, brochure printed from Trimble's Web Site on Sep. 23, 2002, 4 pages.

New Fast GPS Code Acquisition Using FFT, Electronic Letters, vol. 27 No. 2, pp. 158-160 (1991) (2 pages).

Novel Fast GPS/GLONASS Code Acquisition Technique Using Low Update Rate FFT, Electronic Letters, vol. 28 No. 9, pp. 863-865 (3 pages).

Marketing Material: Qualcomm CDMA Technologies—Integrated Solutions—MGP6200™ Multimode GPS Processor (8 pages).

Marketing Material: uNav Microelectronics—uN9x18 Low Power, High Performance GPS Receiver Chipset/uN9x18 GPS Receiver Solution (9 pages).

Marketing Material: uNav Microelectronics, uN9x18 Low Power, High Performance GPS Receiver Chipset (2 pages).

Marketing Material: Global Locate—Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

* cited by examiner

NAVAGATION PROCESSING BETWEEN A TRACKER HARDWARE DEVICE AND A COMPUTER HOST BASED ON A SATELLITE POSITIONING SOLUTION SYSTEM

CROSS-REFERENCE TO RELATED APPLICATIONS

This application in related to Ser. No. 10/269,105 titled "HOST BASED SATELLITE POSITIONING SYSTEMS", filed Oct. 10, 2002, and Ser. No. 10/269,105 titled "LAYERED HOST BASED SATELLITE POSITIONING SOLUTIONS", filed Oct. 10, 2002, both of which are incorporated herein by reference in their entirety.

BACKGROUND OF THE INVENTION

1. Field of the Invention

This invention relates to satellite positioning systems. In particular, this invention relates to satellite positioning systems implemented using the processing power of a host in communication with satellite positioning tracker hardware device over a predefined interface.

2. Related Art

Worldwide use of satellite positioning systems (SPS), such as the Global Positioning System (GPS) is growing at a rapid pace. Current trends are calling for the incorporation of GPS services into a broad range of electronic devices and systems, including Personal Digital Assistants (PDAs), cellular telephones, portable computers, automobiles, and the like. At the same time, manufacturers constantly strive to reduce costs, simply designs and produce the most cost-attractive product possible for consumers.

In the past, providing a GPS solution, such as handheld GPS devices, often required expensive dedicated GPS signal reception and processing hardware, as well as dedicated post processing hardware for resolving location measurements, displaying location coordinates, updating map displays, and the like. However, given the rapid growth in speed, sophistication, and processing power of the host microprocessors present in the host computer devices (e.g., in a cell phone, personal digital assistant or automobile), the possibility exists for allowing the host computer to bear the burden not only of running its regular applications, but also to operate as part of the GPS solution. Such an approach is presented in U.S. Pat. No. 6,430,503, titled "Distributed GPS Navigation System", the entirety of which is incorporated herein by reference in its entirety.

Currently, however, there is a strong push toward incorporating GPS solutions in many electronic devices designed by numerous manufacturers. Of course, each device varies considerably in architecture, operating system, hardware interfaces, and the like. Prior GPS solutions did not provide the flexibility that allowed the solutions to be adapted to a wide range of electronic devices. Instead, expensive customized solutions were needed for each device, thereby undesirably increasing costs and delaying the introduction of GPS services into a wide range of devices. The prior GPS host solutions also rely on interrupts to the host computer in order to service a GPS function. The use of interrupts adversely impacts the performance of the host computer. Further, traditional protocols require acknowledgement of message exchanges impacting the performance of the host.

Some attempts to divide the processing of GPS location data between a host computer and tracker hardware device have been attempted. They often are limited to transferring formatted location data over a standard interface. The restraint of using a standard interface for transferring formatted location data limits the potential of the tracker hardware device in a host computer/tracker hardware device implementation.

Therefore, a need exists for implementations of GPS solutions that overcome the problems noted above and others previously experienced.

SUMMARY

Methods and systems consistent with the present invention provide a message interface between a computer host and a hardware tracker in a host based SPS solution. The SPS is described as a GPS solution. As a result of separating the tracker hardware device from the host computer, a wide variety of electronic devices may incorporate GPS functionality with less expense using less development time.

In one implementation, a host based positioning system includes host computer system that connects through a tracker hardware interface to a dedicated hardware space vehicle tracker. The tracker hardware interface formats and decodes messages from the hardware tracker a more logical division of the tracking function from the location data formatting.

Other apparatus, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

The invention may be better understood with reference to the following figures. The components in the figures are not necessarily to scale, emphasis instead being placed upon illustrating the principals of the invention. Moreover, in the figures, like reference numerals designate corresponding parts throughout the different views.

Figure 1:
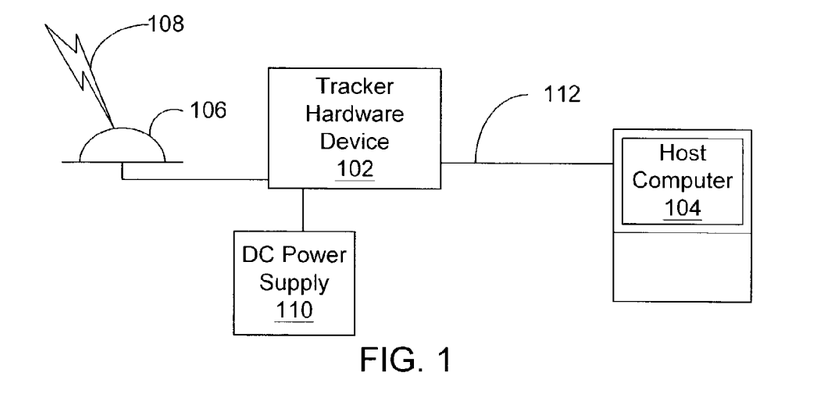
FIG. 1 is a diagram of an exemplary positioning system implemented as a layered host computer based GPS solution having tracker hardware device in communication with a host.

In FIG. 1, a diagram of an exemplary positioning system 100 implemented as a layered host based satellite positioning system with a GPS solution having tracker hardware device 102 in communication with a host computer 104 is shown. The tracker hardware device 102 is connected to a GPS antenna 106 capable of receiving multiple GPS signals 108 from a plurality of satellites. The tracker hardware device 102 is also depicted as being connected to a DC power supply 110.

The tracker hardware device 102 communicates with the host computer 104 over a hardware tracker interface link 112. Examples of the hardware tracker interface link 112 includes, but are not limited to, a serial connection (including a universal serial bus (USB), a small computer serial interface (SCSI)), a parallel connection, and a wireless connection (including RF connections and infrared connections).

The tracker hardware device 102 may be receive power from the DC power supply 110 that is separate from the power supply of the host computer 104, or in an alternate embodiment may receive power from the host computer 104 via the hardware tracker interface link 112. Further, the GPS antenna 106 may be separate from the tracker hardware device 102 or integrated within the same housing as the tracker hardware device 102.

Figure 2:
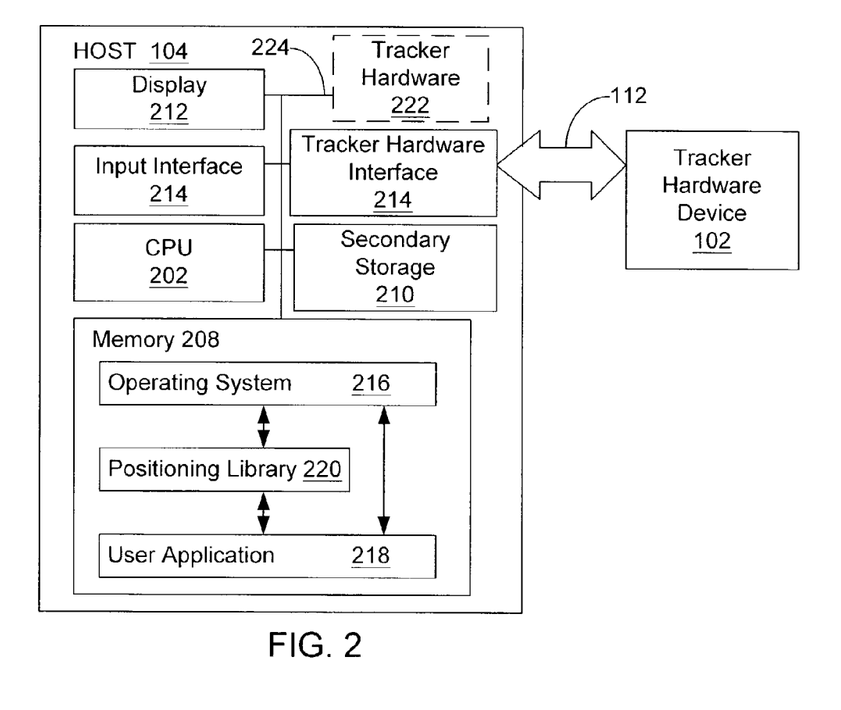
FIG. 2 is a block diagram of the exemplar position system of FIG. 1.

Turning to FIG. 2, a block diagram of the exemplar position system of FIG. 1 is shown. The computer host 104 includes a central processing unit (CPU) 202, a hardware tracker interface link 112, and a memory 208. The CPU 202 is a controller and may be implemented as a microprocessor, embedded controller, application specific integrated circuit (ASIC), discrete logic circuits acting as a controller, analog circuits acting as a controller, and a combination of discrete logic and analog circuits. The host computer 104 also includes a secondary storage device 210, and a display 212, and an input interface 214 (e.g., a mouse, keyboard, and the like).

An operating system 216 (e.g., Windows CE, Palm OS. UNIX, QNX, or the like) is a plurality of instructions that reside and are executed from memory 208. A plurality of user applications 218 communicates with a positioning library 220 and be operating system 216. One of the user applications 218 may receive position information from the positioning library, and may also communicate commands to the positioning library. The user application 218 may be virtually any program that uses positioning information, including, as examples, a mapping program, course charter, location aid, and the like.

The host computer 104 connects through the hardware tracker interface 214 and the interface connection 112 to the tracker hardware device 102. The hardware tracker interface 214 may be virtually any type of data transfer interface (as examples, a serial, parallel, PCMCIA card, USB, PC Card, or network interface). In one implementation, the hardware tracker interface 214 is an RS232 port running at 38,400 bps, N-8-1 that communicates up to 2 KB of data per second between the tracker hardware device 102 and the computer host 104.

In other implementations, the tracker hardware device (as illustrated by the reference numeral 222) is more closely incorporated into the host computer 104. Thus, rather than connecting to the computer host 104 through the interface connection link 112, for example, the tracker hardware device 222 may be directly coupled to the host computer 104 address, data, and control buses 224. As will be explained in more detail below, the host computer 104 receives and processes navigation information from the hardware tracker 102, or in an alternate embodiment 222 in order to provide the plurality of user applications 218 with position information.

Although aspects of the present invention are depicted as being stored in memory 208, one skilled in the art will appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed. Further, although specific components of positioning system 100 are described, one skilled in the art will appreciate that a positioning system suitable for use with methods, systems, and articles of manufacture consistent with the present invention may contain additional or different components.

Figure 3:
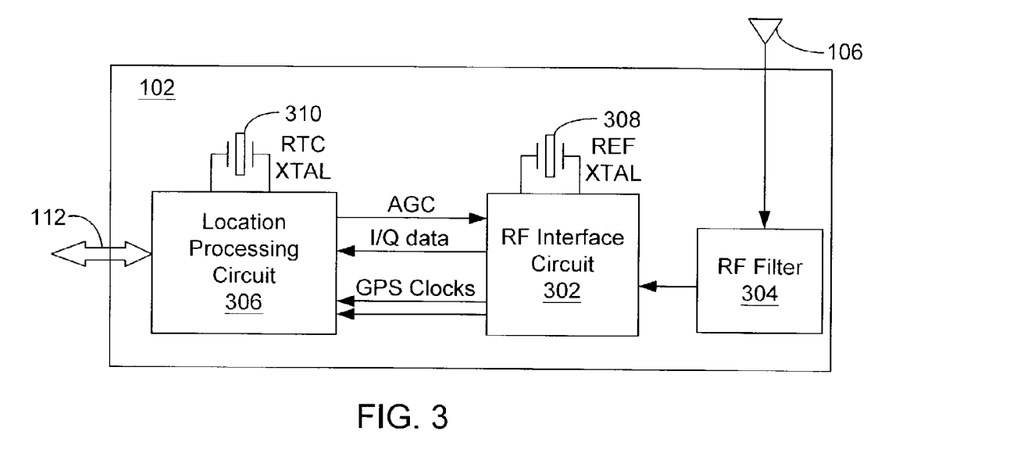
FIG. 3 illustrates the tracker hardware device of FIG. 2.

In FIG. 3, the tracker hardware device 102 of FIG. 2 is illustrated. The tracker hardware device 102 acquires and tracks GPS satellites and sends raw measurement data to the host computer 104 for position calculation. To that end, the tracker hardware device 102 includes an antenna 106 for receiving GPS satellite signals 108 that are filtered by a radio frequency (RF) filter 304 for passing the signals to the RF interface circuit 302. The RF interface circuit 302 processes the signals, produces 2-bit Inphase and Quadrature (I/Q) signals and recovers GPS clocks. The RF interface circuit 302 provides the I/Q signals and GPS clocks to the location processing circuit 306 for digital processing. A reference frequency source 308 (e.g., a crystal oscillator) provides a reference clock for the RF interface circuit 302, while the real time clock (RTC) source 310 provides a reference clock for the location processing circuit 306.

The tracker hardware device 102 may be implemented with components available from SiRF Technology, Inc. of San Jose Calif. For example, the RF interface circuit 302 may be implemented as a GRF2i/LP integrated circuit. The location processing circuit may be implemented, as examples, as a GSP2t integrated circuit or GSP2e integrated circuit. The tracker hardware device 102 minimizes the overhead on the host computer 104 and operating system 216 by keeping low the maximum transmission rate of raw measurements to the host computer 104 (e.g., one measurement per second).

Figure 4:
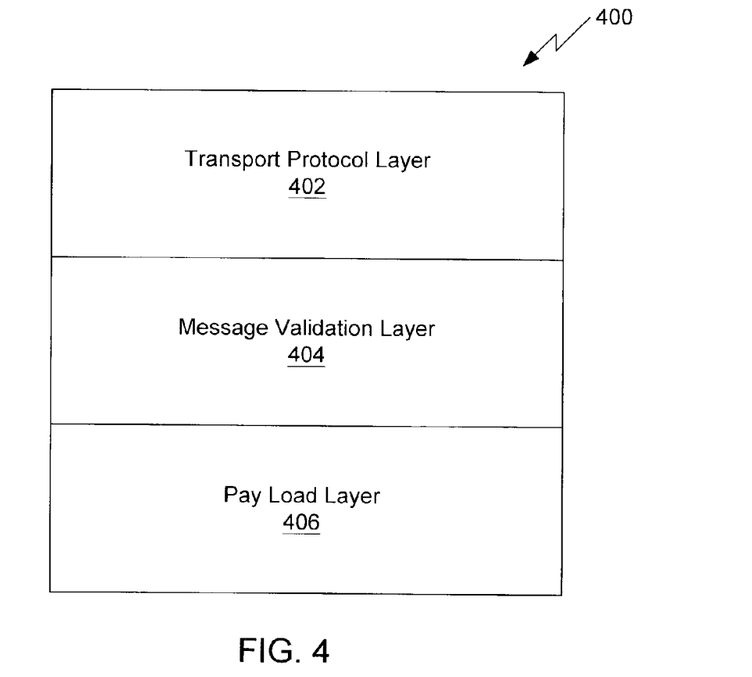
FIG. 4 is a diagram of a protocol stack that enables data transfer across the hardware tracker interface link of FIG. 3.

In FIG. 4, a diagram of a protocol stack 400 that enables data transfer across the hardware tracker interface link 112 of FIG. 3 is shown. The transport layer 402 of the protocol stack 400 encapsulates a GPS message within two start characters and two stop characters. The values are chosen to be easily identifiable and such that they are unlikely to occur frequently in the data. In addition the transport layer prefixes the message with a two-byte (15-bit) message length and a two-byte (15-bit) check sum. The values of the start and stop characters and the choice of a 15-bit values for length and check sum are designed such that both message length and check sum can not alias with either the stop or start code.

The transport layer 402 does not depend on the payload data, and it does not escape any payload data. Therefore the payload can contain legal start and stop code sequences. The transport layer is constructed such that given a lossless environment all messages will be correctly received. Nonetheless, if data is lost synchronization should be easily regained.

The validation layer 404 is of part of the transport layer 402, but operates independently. The purpose of the validation layer 404 is to make transmission errors detectable by a receiving device (tracker hardware device 102 or hardware tracker interface 214). The validation layer 404 has a byte count that refers to the payload byte length. Likewise, the check sum is a sum on the payload. The check sum is a 15-bit byte check sum of the payload data 406. The payload data 406 is assumed to consist of a single byte message identifier and the remaining data bytes and is encapsulated by the message validation layer 404 and transport protocol layer 402.

The protocol that enables tracker hardware device 102 and the computer host 104 maintains proper synchronization via acknowledgement messages. But, when the host computer 104 is busy with other applications it may opt not to acknowledge messages from the tracker hardware device 102. In order to maintain synchronization, the messages from the host computer 104 to the tracker hardware device 102 are acknowledged by the tracker hardware device 102. The tracker hardware device 102 and associated software is robust to missing messages and does not have to reset the tracker interface link 112 or the tracker hardware device 102 when the host computer 104 does not acknowledge one or more messages from the tracker hardware device 102. Thus, and advantage is achieved because of the messages from the tracker device 102 to a busy host computer 104 may not be acknowledged.

Figure 5:
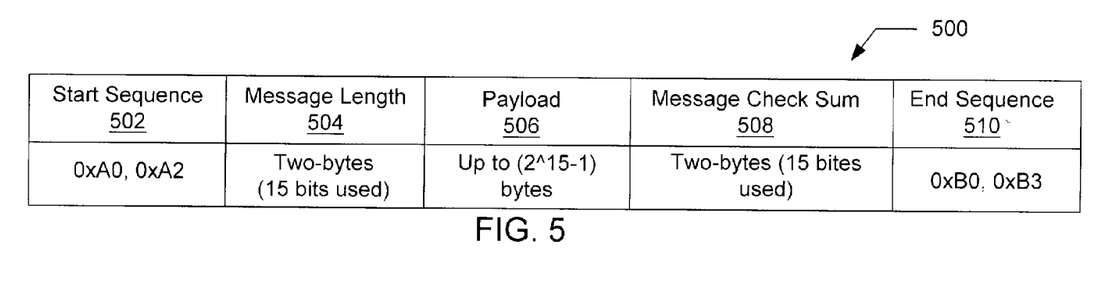
FIG. 5 is an illustration of the message format according to the protocol stack of FIG. 4.

Turning to FIG. 5 an illustration of the message format 500 according to the protocol stack of FIG. 4 is shown. The message format 500 starts with a start sequence 502. The start sequence is shown as 0xA0, 0xA2, but in alternate embodiments different values may be chosen. The message length 504 follows the start sequence 502. The message length is transmitted high order byte first, followed by the low byte. This is the so-called big-endian order. The High Byte must be less or equal to 0x7F. Even though the protocol has a maximum length of (2^15−1) bytes, practical considerations require the implementation to limit this value to a smaller number. Likewise, the receiving programs may limit the actual size to something less than this maximum.

The payload 506 follows the message length 504. The payload 506 may contain any 8-bit value. Where multi-byte values are in the payload 506 neither the alignment nor the byte order are defined as part of the transport; though tracker hardware device 102 payloads use the big-endian order. It should be noted that some processors do not allow arbitrary byte alignment of multi-byte data and resulting in errors when reading data delivered as payload data. The hardware tracker interface 112 may include an API that includes methods for reading unaligned data into larger processor types.

The check sum 508 follows the payload 506 and is transmitted with the high order byte first followed by the low order byte. This is the so-called big-endian order. The check sum is 15-bit check sum of the bytes in the payload data. The following pseudo-code defines the algorithm used:

Let message be the array of bytes to be sent by the transport.
Let msgLen be the number of bytes in the message array to be transmitted.
index=first_byte
checkSum=0
while (index<msgLen)
    checkSum=checkSum+message[index]
checksum=checkSum AND (2^15−1)

The receiving device to insure receipt of uncorrupted messages uses the check sum 508 derived by the sending device.

The last part of the message format 500 is an end sequence 510. The end sequence 510 is 0xB0 and 0xB3. In an alternate embodiment, end sequence values other than 0xB0 and 0xB3 may be used. By monitoring for the start sequence 502 and end sequence 510, a receiving device is able to identify when complete messages are received.

Examples of message sent from the tracker hardware device 102 to the host computer 104 that may be defined by a message identification code (MID) and length carried in the payload 506 include, but is not limited to:

1. MEASURED DATA (MID: 0x20, Len: 85 bytes)
   One message for every currently tracking channel (0 to 12) tracked by the tracker hardware device 102 and is sent every one second.
2. COMPLETE (MID: 0x23, Len: 36 bytes)
   Contains tracker status and RTC data.
   Once a second after initial acquisition to prompt scheduling of one second task.
   Prior to initial acquisition, whenever location data is not being processed.
3. NAV DATA (MID: 0x21, Len: 49 bytes)
   50 bps navigation message data sent once every 6 seconds for each channel.
4. SBAS DATA (MID: 0x22, Len: 20 bytes)
   One message per second is sent.
5. ADC/ODOMETER DATA (MID: 0x2D, Len: 111 bytes @ 1 Hz or 12 bytes @ 10 Hz) Contains 50 Hz ADC measurement averaged every 100 milliSeconds at tracker interrupt along with odometer counter and GPIO inputs (e.g. for reverse input sensing, etc.) Message is sent at 1 Hz rate with ten 100 millisecond measurements or 10 Hz rate with single measurement.
6. ACKNOWLEDGE (MID: 0x0B, Len: 3)
   If feature is enabled, this is sent in response to a received command from navigation that has been successfully parsed and processed.
7. NO-ACKNOWLEDGE (MID: 0x0C, Len: 2)
   Sent in response to a received command from navigation that is not recognized, or is a valid tracker command but has improperly formatted data fields.

Messages may also be sent from a host computer 104 to the tracker hardware device 102. For example:

1. TRACK COMMAND (MID: 0x26, Len: 60 bytes)
   Command to acquire or reacquire satellites with the sent parameters. Sent as needed.
2. TRACK RESET (MID: 0x27, Len: 9 bytes)
   Command to cause a reset of tracker software based on parameters sent. Sent as needed.
3. DOWNLOAD MESSAGE (MID: 0x28, Len: variable)
   Message to cause tracker to write data at a specified address for a specified byte count, or to cause the tracker software to vector to a specified address.
   Sent as needed.
4. RTC CONTROL (MID: 0x24, Len: variable)
   Command to control RTC rollover and low power operation using the RTC for timed wakeup and sleep duration. RTC rollover is sent as needed. Low power, non-autonomous operation requires reissuing this command after each wakeup cycle to perpetuate forthcoming low power cycling.
5. PPS MESSAGE (MID: 0x2A, Len: 9 bytes)
   One Pulse Per Second interface from Navigation to Tracker software that is sent as needed.

The payload 506 for the above messages may contain binary messages, such as:

A. Tracker to Nav—MEASURED DATA

Description: This data block is sent from the Tracker software to the Navigation software. This message will go out for every channel tracking and is output at a 1 Hz rate. This message will be followed by the COMPLETE Message.

| | | |
|---|---|---|
| 8bit | MESSAGE ID0x20 | |
| 32bit | channel | Channel number that is tracking |
| 32bit | bit_number | Bits at 50 bps = 20 ms |
| | | units: 20 ms |
| | | range: 0 to 30,240,000 |
| 16bit | msec_number | Represents time in units of msec |
| | | range: 0 to 19 |
| 32bit | CarrierPhase | Represents time in units of cycles |
| | | units: ½**10 |
| | | range: 0-1540*1023*2**10 cycles |
| 32bit | CodeOffset | Represents time in units of cycles |
| | | units: ½**10 cycles |
| | | range: 0-1540*1023*2**10 cycles |

-continued

| | | |
|---|---|---|
| 32bit | CarrierDopplerRate | Current estimate of Doppler rate cy/iter**2 * 2**N |
| 32bit | CarrierDoppler | Doppler frequency units: ½19 cycles/msec range: 0-(½32 − 1) |
| 32bit | TimeOfMeasurement | Measurement time tag units: ms, since power on |
| 32bit | delta_car_phase | Current carrier phase - previous carrier phase units: ½**16 chips |
| 16bit | buf_status | Status of this buffer(interface): 0 - nothing changed by tracker 1 - updated by tracker |
| 16bit | acquired_svid | Acquired satellite ID |
| 16bit | trk_status | Status of the tracker: Bit 0: Acq/Reacq successful Bit 1: Delta carrier phase valid Bit 2: Bit sync complete Bit 3: Subframe sync completed Bit 4: Carrier pullin done Bit 5: Code locked Bit 6: Acq/Reacq failed flag |
| 16bit | CtoN_ratio[10] | Carrier to noise ratio each one is collected in 100 ms |
| 16bit | correl_interval | Correlation interval units: ms |
| 16bit | search_cnt | # of times to search for a SV |
| 16bit | lock_status | Lock or not lock flag for each 100ms |
| 16bit | power_bad_count | Count of Power in 20 ms below 31 dB-Hz |
| 16bit | phase_bad_count | Count of Power in 20 ms below 31 dB-Hz |
| 16bit | delta_car_interval | Count of ms contained in delta_carrier phase |
| 16bit | TimeInTrack | Count of ms since track started |
| 32bit | MeanDeltaRangeTime | average time before time of DR measurement |
| 32bit | drStartTag | Start time of dr Measurement time tag |
| 16bit | autoCorrStat | Status of autocorrelation detection |

B. Tracker to Nav—NAV DATA

Description: The following is the 50 bps subframe data collected by the Tracker. The satellite message structure has a basic format of a 1500 bit long frame made up of 5 subframes, each subframe being 300 bits long. Each subframe consists of 10 words, each 30 bits long. The MSB of all words shall be transmitted first. This message goes out for every channel approximately every 6 seconds.

| | | |
|---|---|---|
| 8bit | MESSAGE ID0x21 | |
| 32bit | channel | Channel that the data belongs to |
| 32bit | data_50bps[10] | Holds 10 words of data = 320 bits Each word contains 30 bits (32 here) |
| 16bit | buf_status | Buffer filled flag: 0 - no data in buffer (empty) 1 - filled by tracker |
| 16bit | Svid | Satellite ID |

C. Tracker Hardware Device to Computer Host—SBAS DATA

Description: Tracker SBAS data to the Navigation software.

| | | |
|---|---|---|
| 8bit | MESSAGE ID0x22 | |
| 16bit | prn | Satellite PRN |
| 16bit | newFrame | flag to indicate good new frame |
| 16bit | visibilityWord1 | 0x80070046 |
| 16bit | visibilityWord2 | 0x80070048 |
| 8bit | data[32] | The data bits right justified in the word |
| 16bit | report100ms | The 100ms report 0x800d048c |
| 16bit | syncMeasure | |
| 16bit | resync | the number of resync since start |
| 32bit | systime_100ms | System time since power on |

D. Tracker to Nav—COMPLETE

Description: This message is sent to the Navigation software once a second after initial acquisition to prompt scheduling of the Navigation 1 second task. Prior to initial acquisition, this message is sent whenever the tracker software is not processing data. This message contains the state of the tracker and RTC data.

| | | |
|---|---|---|
| 8bit | MESSAGE ID0x23 | |
| 16bit | status | Tracker Startup Status bit 0 - Nav command received since POR bit 1 - Initial acquisition mode bit 2 - Autonomous mode enabled bit 3 - GPS Data message disabled bit 4,5 - Multipath value bit 6 - ADC/Odometer message enabled |
| 8bit | sec | RTC seconds |
| 8bit | min | RTC minutes |
| 8bit | hr | RTC hours |
| 8bit | day | RTC days |
| 16bit | clkctr | RTC clock counter |
| 16bit | segctr | Current segment count within a msec |
| 32bit | tag | Current ms time when RTC read |
| 16bit | segdelay | |
| 8bit | accurate | |
| 16bit | ASIC_ChipVersion | |
| 32bit | RTCok | RTC block status |
| 32bit | RolloverComplete | RTC RolloverComplete |
| 32bit | RolloverSeconds | |
| 32bit | CurrentTimeCount | Tracker Time, millisecond counts |

E. Tracker to Nav—ADC/ODOMETER DATA

Description: This message is sent at a rate of 1 Hz (default) or 10 Hz whenever it is enabled by the control words in the Track Reset message. Both ADC channels are sampled in a round-robin fashion at 50 Hz whose raw measurements are then averaged every 100 mSeconds in the tracker interrupt along with the current odometer counter value and GPIO states. In 1 Hz mode, there are 10 data measurements blocks in one single message. In 10 Hz mode, there is a single data measurement per message.

| | | |
|---|---|---|
| 8bit | MESSAGE ID0x2D | |
| 32bit | currentTime | Tracker Time, millisecond counts |
| 16bit | adc2Avg | Averaged measurement from ADC[2] input |
| 16bit | adc3Avg | Averaged measurement from ADC[3] input |
| | 16bit odoCount | Odometer counter measurement at the most recent 100mSec tracker interrupt |
| 8bit | gpioStat | GPIO input states at the most recent 100mSec tracker interrupt: bit 0 - GPIO[0] input bit 1 - GPIO[2] input bit 2 - GPIO[3] input bit 3 - GPIO[4] input bit 4 - GPIO[5] input bit 5 - GPIO[7] input bit 6 - GPIO[8] input bit 7 - GPIO[12] input |

F. Tracker to Nav—ACKNOWLEDGE

Description: This feature can be enabled by the control words in the Track Reset message. If enabled, this message is sent in response to any legal received command from navigation (except Download) that has been successfully parsed and processed.

| 8bit | MESSAGE ID | 0x0B |
|---|---|---|
| 8bit | msgID_acked | ID of message being acknowledged |
| 8bit | msgID_chan | Channel # specified in TRACK message, otherwise 0 for all other acknowledged messages |

G. Tracker to Nav—NO_ACKNOWLEDGE

Description: Sent in response to a received command from navigation that is not recognized, or is a valid tracker command but has improperly formatted data fields.

| 8bit | MESSAGE ID | 0x0C |
|---|---|---|
| 8bit | msgID_nacked | ID of message that was not recognized or was malformed |

H. Host Computer to Tracker Hardware Device—RTC CONTROL

Description: Nav command to Tracker to control RTC rollover and low power operation using the RTC for timed wakeup and sleep duration. Low power, non-autonomous operation requires re-issuing this command after each wakeup cycle to perpetuate forthcoming low power cycles unless retries have been disabled. Selection of autonomous or non-autonomous mode at startup alters the existing autonomous mode setting previously configured with Track Reset message.

| 8bit | MESSAGE ID 0x24 | |
|---|---|---|
| 8bit | | subMessage Optional Sub message field. If no sub message field is supplied, perform standard rollover function otherwise parse as follows:<br>0 - do selective rollover function<br>1 - RTC controlled sleep/awake duration power cycling<br>2 - RTC controlled sleep/awake duration power cycling with autonomous startup<br>3 - RTC controlled sleep duration and specific wakeup time power cycling<br>4 - RTC controlled sleep duration and specific wakeup time power cycling with autonomous startup<br>5 - cancel any RTC controlled power cycling<br>6 - force RTC time synchronize to GPS time |

Message body varies with sub message as follows:

Sub message 0—Do selective rollover function based on rollover type parameter 8 bit rolloverType Select between complete RTC reset to zero or only adjust RTC days to fit within a week:

0—do complete RTC rollover and reset

1—only adjust RTC days to fit within a week

Sub message 1—Sets the tracker to periodically power Lip and optionally power down after a specified time.

| 32bit | sleepTime | duration in seconds to sleep |
|---|---|---|
| 16bit | awakeTime | duration in seconds to stay awake (powered up)<br>0 - stay awake after wakeup<br>N - stay awake for N seconds after wakeup |
| 8bit | retries | number of times to repeat power cycling without receiving any commands from host processor after which tracker will go to sleep indefinitely unless EIT1 or reset.<br>N - retry N times before giving up<br>(for N = 0 to 254)<br>255 - retry forever and don't give up |

Sub message 2—Sets the tracker to periodically power up in autonomous mode and optionally power down after a specified time.

| 32bit | sleepTime | duration in seconds to sleep |
|---|---|---|
| 16bit | awakeTime | duration in seconds to stay awake (powered up)<br>0 - stay awake after wakeup<br>N - stay awake for N seconds after wakeup |

Sub message 3—Sets the tracker to power up at a specific time of the week in GPS time and optionally power down after a specified time. Tine is accurate to about 6 seconds. Setting a field to an illegal value sets it to a don't care state.

| 8bit | seconds | match time in seconds (0-59) to wake up |
|---|---|---|
| 8bit | minutes | match time in minutes (0-59) to wake up |
| 8bit | hours | match time in hours (0-23) to wake up |
| 8bit | dayOfWeek | match day of week (0-6) to wake up |
| 16bit | awakeTime | duration in seconds to stay awake (powered up)<br>0 - stay awake after wakeup<br>N - stay awake for N seconds after wakeup |
| 8bit | retries | number of times to repeat power cycling without receiving any commands from host processor after which tracker will go to sleep indefinitely unless EIT1 or reset.<br>N - retry N times before giving up (for N = 0 to 254)<br>255 - retry forever and don't give up |

Sub message 4—Sets the tracker to power up in autonomous mode at a specific time of the week in GPS time and optionally power down after a specified time. Time is accurate to about 6 seconds. Setting a field to an illegal value sets it to a don't care state.

| 8bit | seconds | match time in seconds (0-59) to wake up |
|---|---|---|
| 8bit | minutes | match time in minutes (0-59) to wake up |
| 8bit | hours | match time in hours (0-23) to wake up |
| 8bit | dayOfWeek | match day of week (0-6) to wake up |
| 16bit | awakeTime | duration in seconds to stay awake (powered up)<br>0 - stay awake after wakeup<br>N - stay awake for N seconds after wakeup |

Sub message 5—Cancel any scheduled RTC controlled power cycling

No fields.

Sub message 6—Instructs the tracker to set the RTC to a time of week close to GPS time. The accuracy is about 6 seconds. This sub message should be issued prior to using sub message 3 or 4 in order to correctly set the RTC for accurate wake up. It will attempt to sync for 2 minutes in the event no satellites are being tracked when the command is issued.

No fields.

I. Nav to Tracker—TRACK COMMAND

Description: The Navigation software will fill this data block to command the tracking process to Acquire and Reacquire satellites.

| | | |
|---|---|---|
| 8bit | MESSAGE ID8bit | 0x26 |
| 8bit | ReacqType | Type of reacquisition |
| | | 0 = REACQ_INITIAL |
| | | 1 = REACQ_RESUME |
| | | 2 = REACQ_TRICKLE |
| 8bit | CodeSearchType | Type of code search |
| | | 1 = Use a Bounce type search |
| | | 2 = Use a Sweep type search |
| 8bit | DopSearchType | Type of Doppler search |
| | | 1 = Use a Bounce type search |
| | | 2 = Use a Sweep type search |
| 8bit | DataSyncType | Type of data synchronization to use |
| | | 1 = Bit sync and frame sync are not required |
| | | 2 = Bit sync is required |
| | | 3 = Bit sync and frame sync are required |
| 8bit | cmd_type | Command type |
| | | 0x01 = Initial acquisition command |
| | | 0x02 = Reacquisition command |
| | | 0x04 = Force subframe command |
| | | 0x08 = Put channel to IDLE mode (kill) |
| | | 0x10 = Find cross correlated satellite |
| | | 0x20 = Force bit sync command |
| | | 0x40 = Cold Start - Initial acquisition command |
| | | 0x80 = start channel as SBAS |
| 32bit | FirstCodeSearchSize | Size of first code search |
| 32bit | half_code_range | Size of largest code search |
| 32bit | StartCodePhase | initial code phase in chips |
| 32bit | FirstDopSearchSize | Size of first Doppler search |
| 32bit | half_doppler_range | Size of largest Doppler search |
| 32bit | cbin_carrier_doppler | Doppler of initial search bin |
| 16bit | coherent_time | Coherent integration time |
| 16bit | noncoherent_time | cnt = noncoherent (ms) / coherent (ms) |
| 32bit | CodeStep | Chips |
| 32bit | DopStep | Reacq |
| 32bit | prepos_timetag | Timetag at which prepositioning |
| 16bit | msec_number | Represents time in units of msec |
| 32bit | bit_number | Bits at 50 bps = 20 ms |
| 16bit | Svid | Satellite ID (1-32) |
| 32bit | channel | Channel number: Set by NAV only |
| 16bit | buf_status | This buffer's status(interface) |

J. Nav to Tracker—TRACK RESET

Description: This message is sent from the Navigation Software to the Tracker software to cause a reset of the tracker software. Resets can be issued for the standard soft reset requests or to change the state/modes of the tracker software. The field for commanded clock divisor rate is shared with the commanded ADC rate depending on the control word setting. If both clock rate and ADC control word bits are set, then the field defaults as the commanded clock divisor rate and the ADC rate will remain unchanged.

| | | |
|---|---|---|
| 8bit | MESSAGE ID | 0x27 |
| 16bit | change control word | control word indicating states/modes to be modified |
| | | bit 0 - Autonomous Mode |
| | | bit 1 - Debug Message |
| | | bit 2 - GPS Data Message |
| | | bit 3 - ADC/Odometer Message |
| | | bit 4 - Acknowledge Reply Message |
| | | bit 9 - Multipath Command |
| | | bit 10 - Clock Rate Command |
| | | bit 11 - Baud Rate Command |
| | | bit 15 - Full Factory Reset |
| 16bit | set state word | control word to set state to enable/disable: |
| | | 0=Disable, 1=Enable |
| | | bit 0 - Autonomous Mode Default |
| | | bit 1 - Debug Message |
| | | bit 2 - GPS Data Message Off |
| | | bit 3 - ADC/Odometer Message |
| | | bit 4 - Acknowledge Reply Message |
| 16bit | commanded baud rate | configured baud rate [0 to 4], or divisor |
| | | 0 or 0x1400 = 9600 baud |
| | | 1 or 0x0A00 = 19200 baud |
| | | 2 or 0x0500 = 38400 baud Default |
| | | 3 or 0x0350 = 57600 baud |
| | | 4 or 0x01B0 = 115200 baud |
| | | 49075200 / divisor = user custom baud rate |
| 8bit | commanded clock divisor | clock divider [0 to 7] |
| | | 0 = 50 MHz |
| | | 1 = 25 MHz |
| | | 2 = 12 MHz Default |
| | | 3 = 6 MHz Expect limited operation |
| | | 4 = 3 MHz Expect limited operation |
| | | OR |
| | commanded ADC rate | ADC message rate |
| | | 0 = 10 Hz @ 5120x decimation |
| | | 1 = 1 Hz @ Default 5120x decimation |
| | | 128 = 10 Hz @ 512x decimation |
| | | 129 = 1 Hz @ 512x decimation |
| | | MSB in the ADC message rate enables the 512x decimation mode of the ADC |
| 8bit | commanded multipath | multipath mode |
| | | 0=none, |
| | | 1=narrow, |
| | | 2=sirf multipath |

K. Nav to Tracker—DOWNLOAD MESSAGE

Description: This message is sent from the Navigation Software to cause the Tracker to write data at a specified address for a specified byte count, or to cause the tracker software to vector to a specified address.

| | | |
|---|---|---|
| 8bit | MESSAGE ID | 0x28 |
| 8bit | Format (3 or 7) | Message type indicator: 3 = write address, 7 = vector address |
| 8bit | ByteCnt | number of bytes to write |
| 32bit | Address | address of data |
| (data of variable length) | | data to write into an address specified above |

L. Nav to Tracker—PPS MESSAGE

Description: One Pulse Per Second (PPS) message from Navigation to Tracker software to initiate a 1PPS output pulse on the tine-mark output pin at the specified tag/delay. Internal PPS queue is three deep to accommodate preloading of tag/delay values 3 seconds in advance.

| | |
|---|---|
| 8bit | MESSAGE ID0x2A |
| 32bit | tag |
| 32bit | delay |

Other messages, such as LOCK DATA may me defined to transfer data from the host computer 104 to the tracker hardware device 102 and aid in the trackers ability to acquire satellites and lock onto the GPS signals. By defining a GPS protocol and interface between the tracker hardware device 102 and host computer 104, the prior limitations of stand interfaces is overcome.

Figure 6:
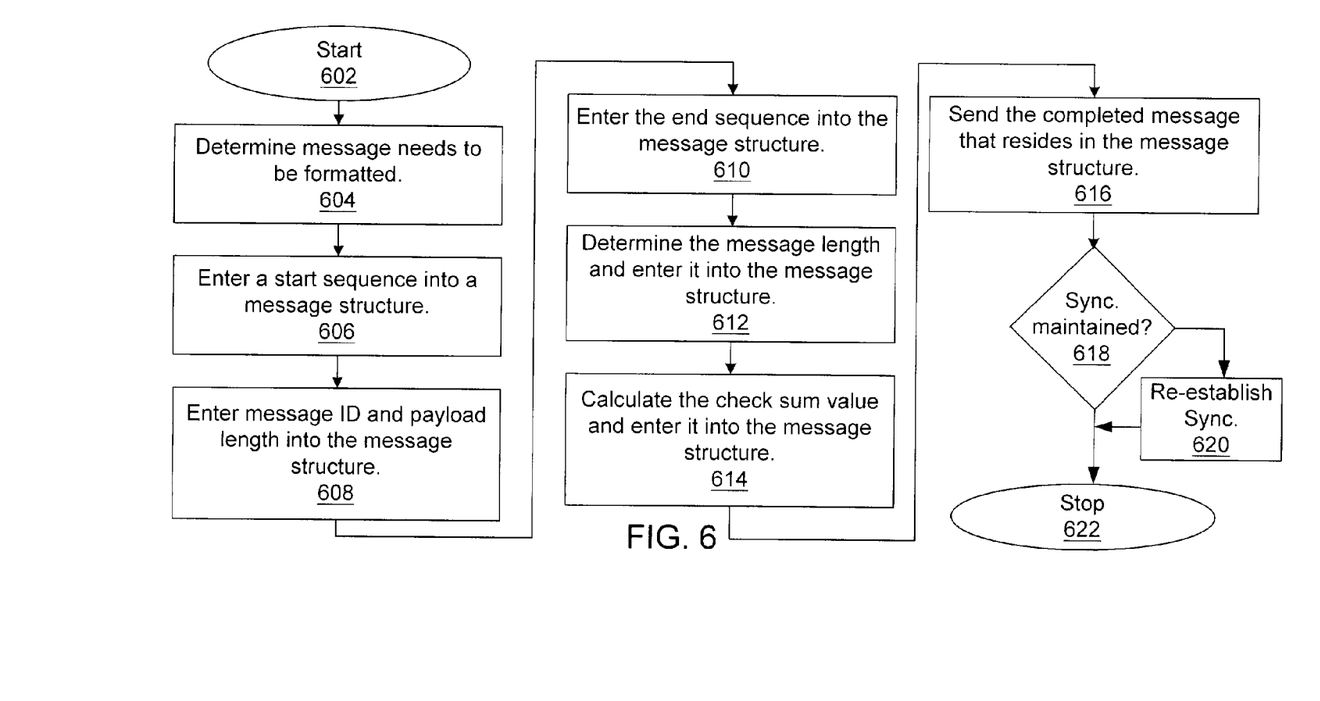
FIG. 6 is a flowchart of the process for formatting a message according to the message format of FIG. 5.

In FIG. 6 is a flowchart of the process for formatting a message according to the message format of FIG. 5. The process starts 602 with the tracker hardware device 102 determining that a message to the host computer 104 needs to be formatted 604 (i.e. NAV DATA). A stat sequence 502 0xA0 and 0xA2 is entered into a message structure 606. The message structure may be implemented as an array data structure of message format 500 in software located on the tracker hardware device 102.

The MID 0x21 associated with the message NAV DATA message that is being formatted and the length of the 49 bytes of data being transferred is inserted in the payload portion 506 of the message structure 608. In 610, the end sequence 510 of 0xB0 and 0xB3 is entered into the message structure to signal the end of the message. The length of the complete message 504 is then determined and entered into the message structure 612. The length of the message is ascertainable because the length of the checksum is known to be 15 bits. The checksum 508 for the message is calculated using a predefined algorithm, such as the algorithm previously described. The calculated checksum is then entered in the message structure 614.

The competed message in the message structure is then sent 616 from the tracker hardware device 102 to the host computer 104. The tracker hardware device 102 waits a predetermined time, such as 5 s seconds, to receive an acknowledge message (a receive acknowledge message) from the host computer 104. The host computer 104 may be busy and unable to send an acknowledge message to the tracker hardware device 102. Synchronization of the message link between the tracker hardware device 102 and the tracker hardware interface 214 is maintained when expected acknowledge message are not received at the tracker hardware device 102. The hardware tracker interface link 112 is monitored periodically to determine if synchronization is maintained 618 and processing is complete 622. Otherwise if the hardware tracker link 112 is not synchronized, then it is re-established 620. Thus, messages from the tracker hardware device sends messages that may not be acknowledged, even through the host computer 104 may optionally acknowledge receipt of a message. The order of the process steps may be changed while still resulting in a complete message. Further, the decoding of a message from the host computer 104 by the tracker hardware device 102 is accomplished by reversing the process of creating a message.

It is appreciated by those skilled in the art that the process shown in FIG. 6 may selectively be implemented in hardware, software or a combination of hardware and software. An embodiment of the process steps employs at least one machine-readable signal bearing medium. Examples of machine-readable signal bearing mediums include computer-readable mediums such as a magnetic storage medium (i.e. floppy disks, or optical storage such as compact disk (CD) or digital video disk (DVD)), a biological storage medium, or an atomic storage medium, a discrete logic circuit(s) having logic gates for implementing logic functions upon data signals, an application specific integrated circuit having appropriate logic gates, a programmable gate array(s) (PGA), a field programmable gate array (FPGA), a random access memory device (RAM), read only memory device (ROM), electronic programmable random access memory (EPROM), or equivalent. Note that the computer-readable medium could even be paper or another suitable medium, upon which the computer instruction is printed, as the program can be electronically captured, via for instance optical scanning of the paper or other medium, then compiled, interpreted or otherwise processed in a suitable manner if necessary, and then stored in a computer memory.

Additionally, machine-readable signal bearing medium includes computer-readable signal bearing mediums. Computer-readable signal bearing mediums have a modulated carrier signal transmitted over one or more wire based, wireless or fiber optic networks or within a system. For example, one or more wire based, wireless or fiber optic network, such as the telephone network, a local area network, the Internet, or a wireless network having a component of a computer-readable signal residing or passing through the network. The computer readable signal is a representation of one or more machine instructions written in or implemented with any number of programming languages.

Furthermore, the multiple process steps implemented with a programming language, which comprises an ordered listing of executable instructions for implementing logical functions, can be embodied in any machine-readable signal bearing medium for use by or in connection with an instruction execution system, apparatus, or device, such as a computer-based system, controller-containing system having a processor, microprocessor, digital signal processor, discrete logic circuit functioning as a controller, or other system that can fetch the instructions from the instruction execution system, apparatus, or device and execute the instructions.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. Note also that the implementation may vary between systems. The invention may be implemented with both object-oriented and non-object-oriented programming systems. The claims and their equivalents define the scope of the invention.

What is claimed is:

1. A method of communication between a tracker hardware device and a computer host, comprising:
   identifying a message to be formatted;
   entering a start sequence into a message structure that defines the message;
   entering a message identification and a message payload length in the message structure;
   entering an end sequence into the message structure;
   entering a length of the message derived from information in the message structure;
   calculating a checksum for inclusion in the message structure based on information in the message structure; and
   sending the message from the tracker hardware device via a tracker hardware link to the computer host that is locally located with the tracker hardware device, where the tracker hardware device is able to acquire and track satellites in a satellite positioning system.

2. The method of claim 1, wherein entering the start sequence further includes:
   placing 0xA0 and 0xA2 into the message structure for the start sequence.

3. The method of claim 1, wherein entering the end sequence further includes:
   placing 0xB0 and 0xB3 into the message structure for the end sequence.

4. The method of claim 1, wherein calculating a checksum further includes:
    solving an algorithm defined by:
        index=first_byte
        checkSum=0
        while (index<msgLen)
            checkSum=checkSum+message[index]
        checkSum=checkSum AND (2^15−1)
    Where message is the array of bytes to be sent and msgLen is the number of bytes in the message array to be transmitted.

5. The method of claim 1, further comprises:
    entering measurement data into the payload of the message structure having a message identification of 0x20; and
    encoding in the payload data a channel number, bit number, millisecond number, carrier phase, code offset carrier Doppler rate, carrier Doppler frequency units, and time of measurement.

6. The method of claim 1, further comprising:
    waiting for receipt of an acknowledge message in response to the message sent by the tracker hardware link that may optionally be sent by the host compute.

7. The method of claim 1, wherein identifying further includes:
    determining the message to be formatted is an acknowledge message that is sent in response to receipt of another message at the tracker hardware device.

8. A method of communication between a tracker hardware device a computer host, comprising:
    means for identifying a message to be formatted;
    means for entering a start sequence into a message structure tat defines the message;
    means for entering a message identification and a message payload length in the message structure;
    means for entering an end sequence into the message structure;
    means for entering a length of the message derived from information in the message structure;
    means for calculating a checksum for inclusion in the message structure based on imformation in the message structure; and
    means for sending the message from the tracker hardware device via a tracker hardware link to the computer host that is locally located with the tracker hardware device, where the tracker hardware device is able to acquire and track satellites in a satellite positioning system.

9. The system of claim 8, wherein means for entering the start sequence further includes:
    means for placing 0xA0 and 0xA2 into the message structure for the start sequence.

10. The system of claim 8, wherein means for entering the end sequence further includes:
    means for placing 0xB0 and 0xB3 into the message structure for the end sequence.

11. The system of claim 8, wherein means for calculating a checksum further includes:
    means for solving an algorithm defined by:
        index=first_byte
        checksum=0
        while (index<msgLen)
            checkSum=checkSum+message[index]
        checkSum=checkSum AND (2^15−1)
    Where message is the array of bytes to be sent and msgLen is the number of bytes in the message array to be transmitted.

12. The system of claim 8, further comprises:
    means for entering measurement data into the payload of the message structure having a message identification of 0x20; and
    means for encoding in the payload data a channel number, bit number, millisecond number, carrier phase, code offset carrier Doppler rate, carrier Doppler frequency units, and time of measurement.

13. The method of claim 8, further comprising:
    means for expecting receipt of an acknowledge message in response to the message sent by the tracker hardware link that may optionally be sent by the host compute.

14. The method of claim 8, wherein identifying further includes:
    means for determining the message to be formatted is an acknowledge message that is sent in response to receipt of another message at the tracker hardware device.

15. A computer readable medium, with readable instructions stored on a computer readable medium storing a computer program for formatting a message in a tracker hardware device, comprising:
    a first set of readable instructions for identifying the message to be formatted;
    a second set of readable instructions for entering a start sequence into a message structure that defines the message;
    a third set of readable instructions for entering a message identification and a message payload length in, the message structure;
    a fourth set of readable instructions for entering and end sequence into the message structure;
    a fifth set of readable instructions for entering a length of the message derived from information in the message structure;
    a sixth set of readable instructions for calculating a checksum for inclusion in the message structure based on information in the message structure; and
    a seventh set of readable instructions for sending the message from the tracker hardware device via a tracker hardware link to the computer h.o, st that is locally located with the tracker hardware device, where the tracker hardware device is able to acquire and track satellites in a satellite positioning system.

16. The computer readable medium of claim 15, wherein entering the start sequence further includes:
    an eighth set of readable instructions for placing 0xA0 and 0xA2 into the message structure for the start sequence.

17. The computer readable medium of claim 15, wherein entering the end sequence further includes:
    an eighth set of readable instructions for placing 0xB0 and 0xB3 into the message structure for the end sequence.

18. The computer readable medium of claim 15, wherein calculating a checksum further includes:
    an eight set of readable instructions for solving an algorithm defined by:
        index=first_byte
        checkSum=0
        while (index<msgLen)
            checkSum=checkSum+message[index]
        checkSum=checkSum AND (2^15−1)

Where message is the array of bytes to be sent and msgLen is the number of bytes in the message array to be transmitted.

19. The computer readable medium of claim 15, further comprises:

an eighth set of readable instructions for entering measurement data into the payload of the message structure having a message identification of 0x20; and a ninth set of readable instructions for encoding in the payload data a channel number, bit number, millisecond number, carrier phase, code offset carrier Doppler rate, carrier Doppler frequency units, and time of measurement.

* * * * *